United States Patent
Huang et al.

(10) Patent No.: US 9,709,207 B1
(45) Date of Patent: Jul. 18, 2017

(54) CHASSIS ASSEMBLY STRUCTURE

(71) Applicants: XYZPRINTING, INC., New Taipei (TW); KINPO ELECTRONICS, INC., New Taipei (TW)

(72) Inventors: Chen-Fu Huang, New Taipei (TW); An-Hsiu Lee, New Taipei (TW); Tsai-Yi Lin, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 0 days.

(21) Appl. No.: 15/351,983

(22) Filed: Nov. 15, 2016

(30) Foreign Application Priority Data

Sep. 29, 2016 (CN) .......................... 2016 1 0863530

(51) Int. Cl.
*A47B 47/00* (2006.01)
*F16M 1/08* (2006.01)

(52) U.S. Cl.
CPC ........... *F16M 1/08* (2013.01); *A47B 47/0025* (2013.01); *A47B 47/0066* (2013.01); *A47B 47/0075* (2013.01)

(58) Field of Classification Search
CPC .. F16M 1/08; A47B 47/0025; A47B 47/0066; A47B 47/0075
USPC ................................................. 312/263, 264
See application file for complete search history.

(56) References Cited

U.S. PATENT DOCUMENTS

| | | | | |
|---|---|---|---|---|
| 5,813,738 A | * | 9/1998 | Cheng | F16B 12/14 312/257.1 |
| 5,894,106 A | * | 4/1999 | Schwenk | H01R 4/64 174/50 |
| 2003/0218407 A1 | * | 11/2003 | Chen | B65D 11/1873 312/265.5 |
| 2010/0019630 A1 | * | 1/2010 | Leng | A47B 47/0075 312/107 |
| 2016/0088936 A1 | * | 3/2016 | Mitchell | A47B 47/042 312/108 |
| 2016/0262535 A1 | * | 9/2016 | Berloni | A47B 47/0041 |

* cited by examiner

*Primary Examiner* — Daniel Rohrhoff
(74) *Attorney, Agent, or Firm* — Chun-Ming Shih; HDLS IPR Services (57) ABSTRACT

A chassis assembly structure includes a surrounding plate assembly, first abutting elements, second abutting elements and a third board. The first and second boards are coupled to form the surrounding plate assembly. Each first abutting element has a slider and a first stop plate extended from the first (or second) board, and each second abutting element has first and second convex plates extended from the second (or first) board. Each first convex plate has a first positioning groove at an end and a second stop plate at the other end. Each second convex plate has a second positioning groove, and both ends of each slider are slidably coupled to and limited in each of the first and second positioning grooves, and each first stop plate is stopped and limited by each second stop plate, and the third board covers a side of the surrounding plate assembly.

8 Claims, 9 Drawing Sheets

CHASSIS ASSEMBLY STRUCTURE

FIELD OF THE INVENTION

The technical field relates to a chassis structure, more particularly to a chassis assembly structure.

BACKGROUND OF THE INVENTION

Small machines such as 3D printers, mold cleaning machines, etc usually come with an upper chassis formed by adhering or connecting a plurality of plates and used for covering manufacturing mechanisms to maintain the stability of the manufacturing environment or prevent any working liquid, adhesive or powder from spilling to the outside of the machines.

However, the aforementioned upper casing formed by adhering or connecting the plurality of plates has the following drawbacks. 1. The manufacture and adhesion of the upper casing takes much time and incurs a high defective rate. 2. The upper casing comes with a relatively large volume and requires more transportation space and shipping cost. 3. The upper casing may be broken or cracked at the adhered position, so that the product has a relatively short service life.

In view of the aforementioned drawbacks, the discloser of this disclosure based on years of experience in the related industry conducted extensive researches and experiments, and finally developed a chassis assembly structure of this disclosure to overcome the drawbacks of the prior art.

SUMMARY OF THE INVENTION

Therefore, the present invention provides a chassis assembly structure formed by connecting a plurality of first boards, plurality of second boards and a third board, and the chassis assembly structure has the advantage of saving shipping space and shipping cost, and both ends of each slider are slidably coupled and limited in each first positioning groove and each second positioning groove, and each first stop plate is stopped and limited by each second stop plate, so that the chassis assembly structure has a three-direction position limiting function to improve the stability of assembling the chassis assembly structure.

In an exemplary embodiment of this disclosure, this disclosure provides a chassis assembly structure, comprising: a surrounding plate assembly, formed by assembling and coupling a plurality of first boards and a plurality of second boards with an interval apart from one another; a plurality of first abutting elements, each including a slider and a first stop plate extended from one of the first board and the second board, and each first stop plate having a first locking hole formed thereon; a plurality of second abutting elements, each including a first convex plate and a second convex plate extended from the other one of the first board and the second board, and each first convex plate having a first positioning groove formed at an end and a second stop plate extended from the other end, and each second stop plate having a second locking hole formed thereon, and each second convex plate having a second positioning groove, and both ends of each slider being slidably coupled and limited in each first positioning groove and each second positioning groove, and each first stop plate being stopped and limited by each second stop plate; a third board, covering a side of the surrounding plate assembly, and having a plurality of third locking holes formed on the third board; and a plurality of locking elements, each passing through and being locked to each first locking hole, each second locking hole, and each third locking hole.

DESCRIPTION OF THE PREFERRED EMBODIMENTS

The technical contents of this disclosure will become apparent with the detailed description of preferred embodiments accompanied with the illustration of related drawings as follows.

With reference to FIGS. 1 to 12 for a chassis assembly structure of this disclosure, the chassis assembly structure 10 comprises a surrounding plate assembly 1, a plurality of first abutting elements 2, a plurality of second abutting elements 3, a third board 4, and a plurality of locking elements 5.

In FIGS. 1 to 12, the surrounding plate assembly 1 is formed by assembling and coupling a plurality of first boards 11 and a plurality of second boards 12, and each first board 11 has two opposite first edge sections 111, and each second board 12 has two opposite second edge sections 121.

In FIGS. 1 to 12, each first abutting element 2 includes a slider 21, a first stop plate 22, and an abutting plate 24 extended from one of the first board 11 and the second board 12, and both ends of each slider 21 have two trapezoidal latches 211 respectively, and each first stop plate 22 has a first locking hole 23 and a protruding block 221, and both ends of each protruding block 221 have a trapezoidal bump 222 and a protruding latch 223 respectively.

In FIGS. 1 to 12, each second abutting element 3 includes a first convex plate 31 and a second convex plate 32 extended from the other one of the first board 11 and the second board 12, and each first convex plate 31 and each second convex plate 32 are stopped and limited by each abutting plate 24, and each first convex plate 31 has a first positioning groove 311 at an end and a second stop plate 312 at the other end, and each second stop plate 312 has a second locking hole 313 and a hollow column 315, and each hollow column 315 is configured to be corresponsive to each second locking hole 313, and each hollow column 315 is sandwiched between each first stop plate 22 and each second stop plate 312, and each second convex plate 32 has a second positioning groove 321 and a third positioning groove 322, and both ends of each slider 21 are slidably coupled and limited in each first positioning groove 311 and each second positioning groove 321, and each first stop plate 22 is stopped and limited by each second stop plate 312.

More specifically, each first positioning groove 311 and each second positioning groove 321 are dovetail grooves, and each two trapezoidal latches 211 is slidably coupled and limited in each first positioning groove 311 and each second positioning groove 321.

In addition, each first convex plate 31 and each second convex plate 32 jointly have an installing notch 33, and the installing notch 33, the first positioning groove 311 and the second positioning groove 321 are communicated with one another and each slider 21 is embedded into the first positioning groove 311 and the second positioning groove 321 through the installing notch 33.

In addition, each first positioning groove 311 is opened from an end of the first convex plate 31 to the other end of the first convex plate 31, and each second positioning groove 321 is opened inwardly from an end of the second convex plate 32, and each third positioning groove 322 is opened inwardly from the other end of the second convex plate 32, and each second convex plate 32 has a partitioning block 323 formed between the second positioning groove 321 and the third positioning groove 322, and each trapezoidal bump 222 is slidably coupled and limited in each first positioning groove 311, and each protruding latch 223 is slidably coupled and limited in each third positioning groove 322, and each protruding latch 223 is stopped and limited by each partitioning block 323.

In addition, each first abutting element 2 of this embodiment is formed in each first edge section 111, and each second abutting element 3 is formed in each second edge section 121. However, the invention is not limited to the aforementioned arrangement only, and may be adjusted according to the actual situation as follows. Each first board 11 has a first abutting element 2 in one of the two first edge sections 111 of the first board 11 and a second abutting element 3 in the other one of the two first edge sections 111 of the first board 11, and each second board 12 has a first abutting element 2 at one of the two second edge sections 121 of the second board, and a second abutting element 3 at the other one of the two second edge sections 121 of the second board.

Figure 1:
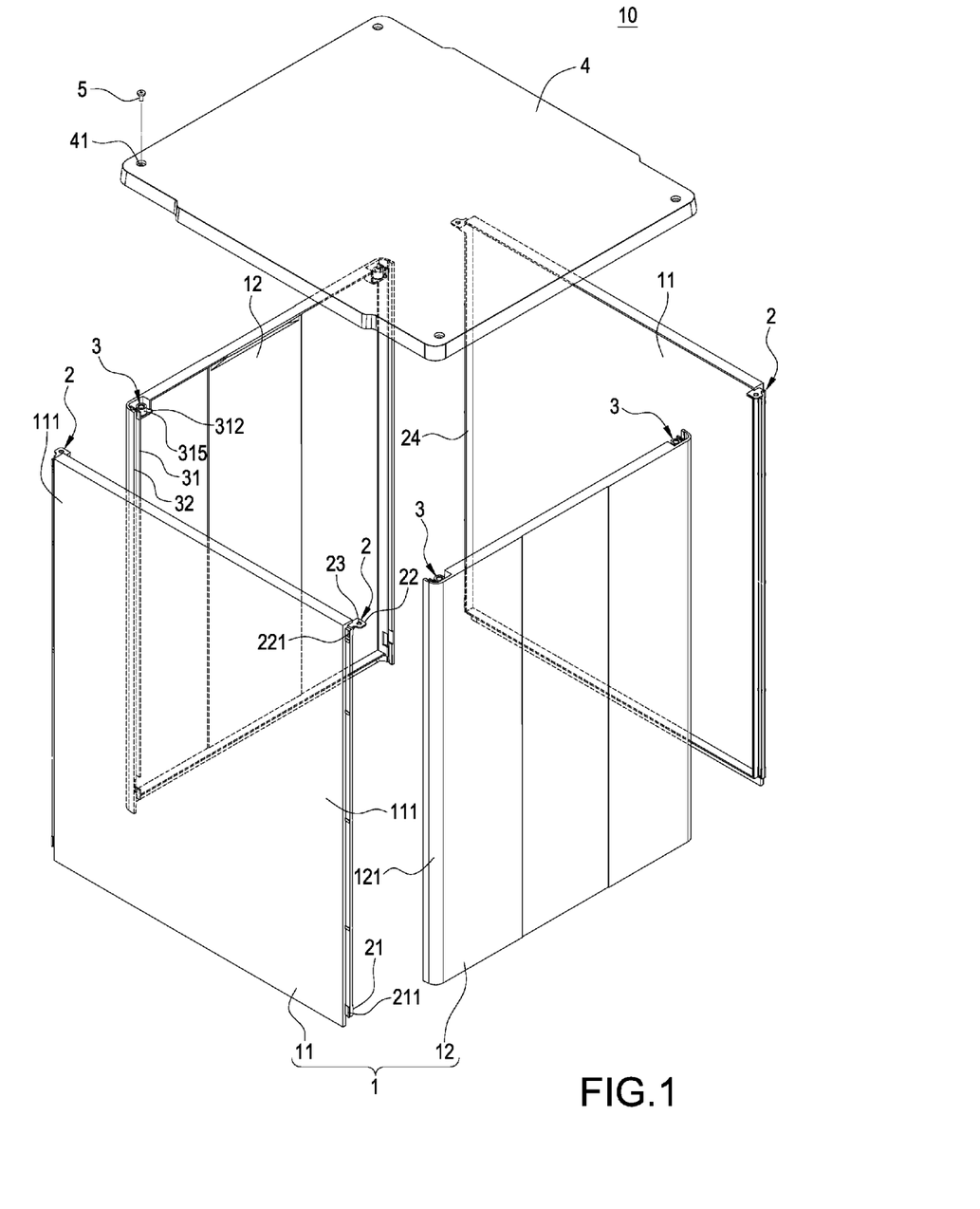
FIG. 1 is an exploded view of a chassis assembly structure of this disclosure.
Figure 2:
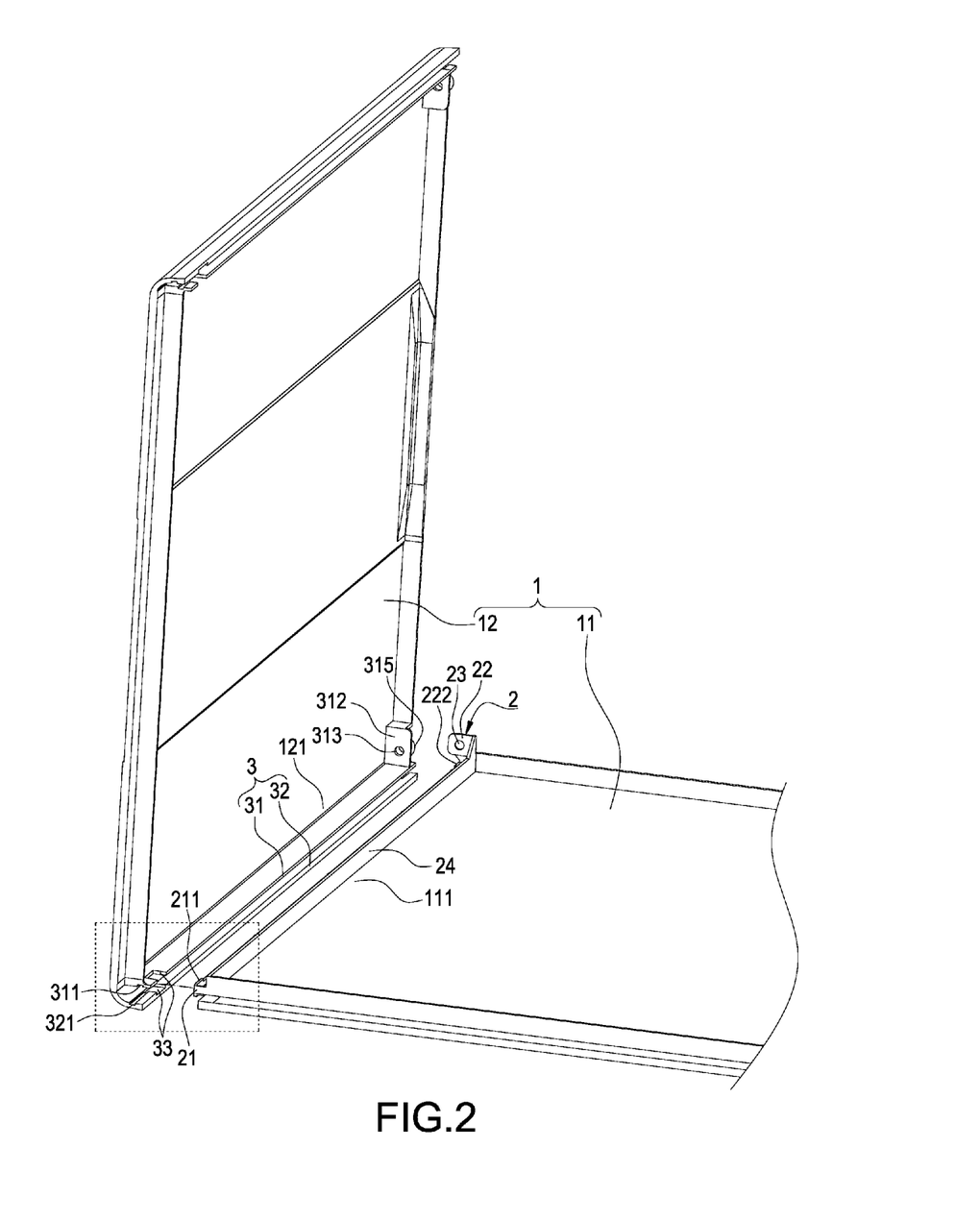
FIG. 2 is another exploded view of a chassis assembly structure of this disclosure.
Figure 3:
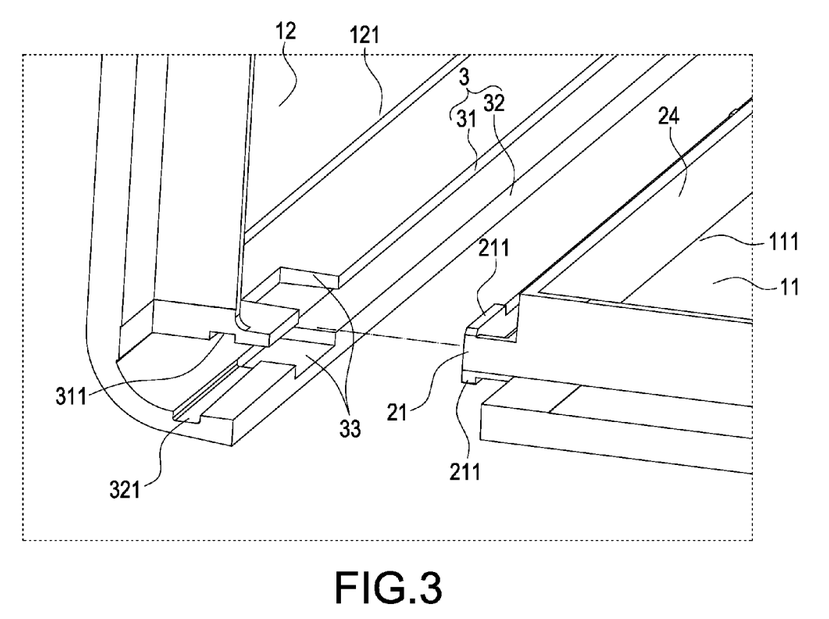
FIG. 3 is a partial exploded view of a chassis assembly structure of this disclosure.
Figure 4:
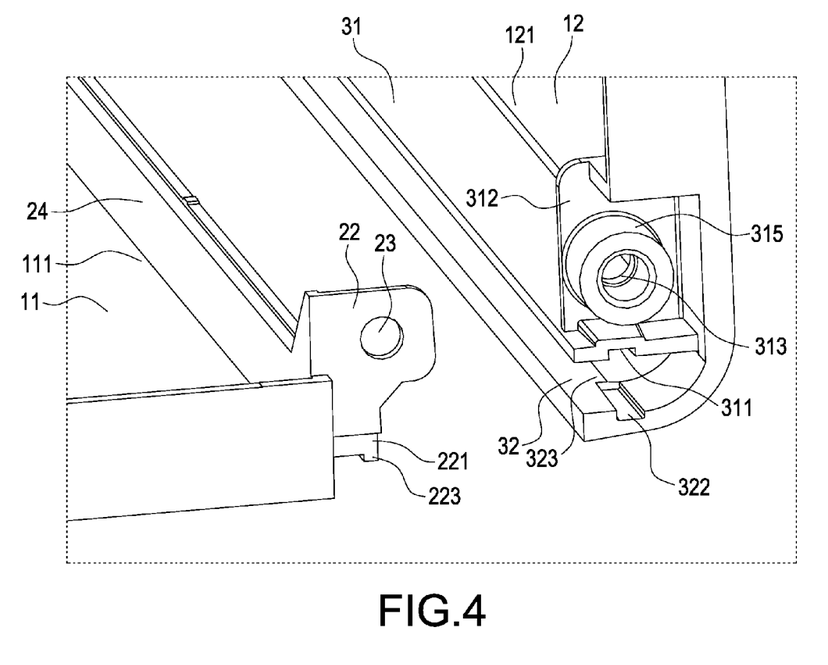
FIG. 4 is another partial exploded view of a chassis assembly structure of this disclosure.
Figure 5:
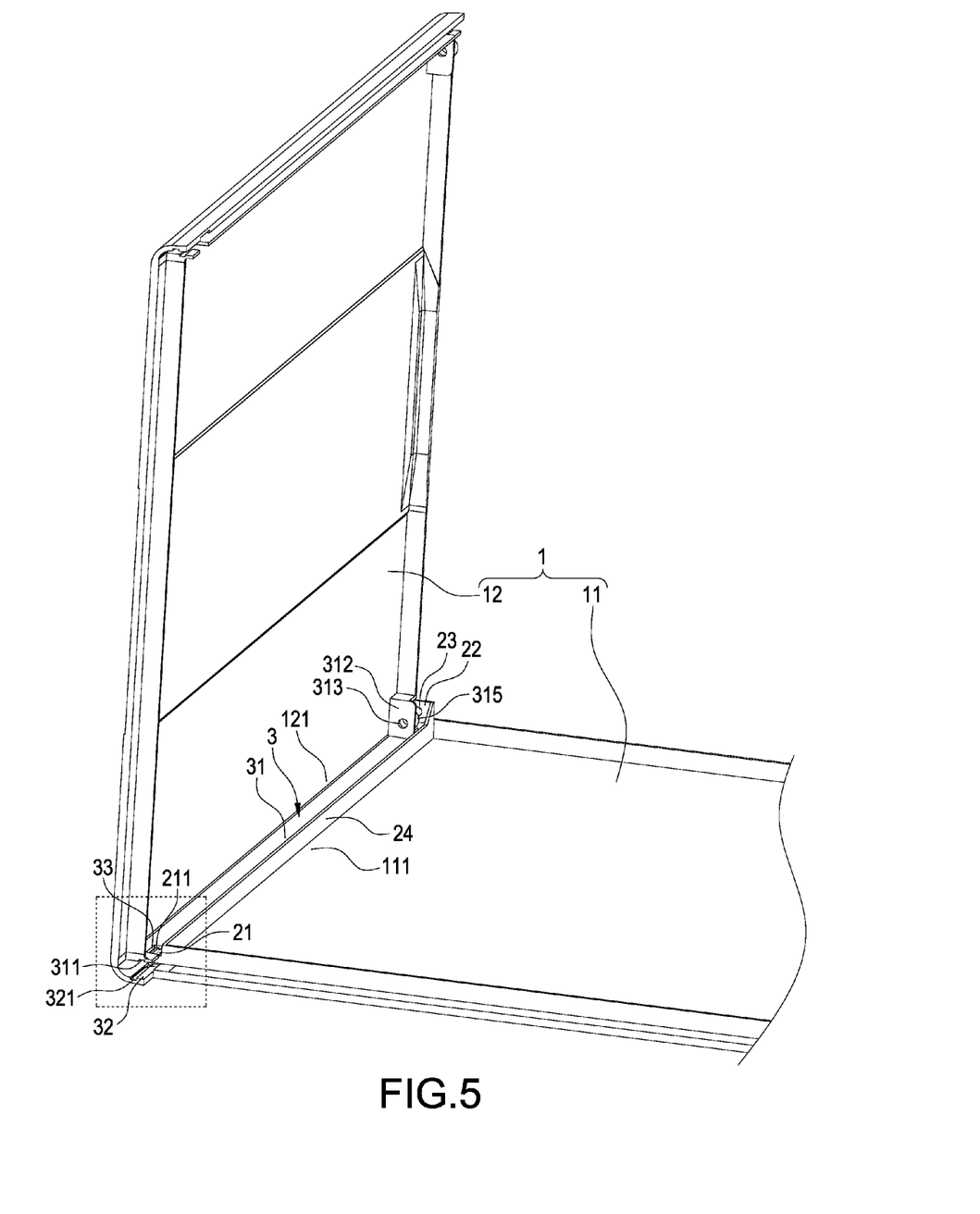
FIG. 5 is a perspective view of a chassis assembly structure of this disclosure.
Figure 6:
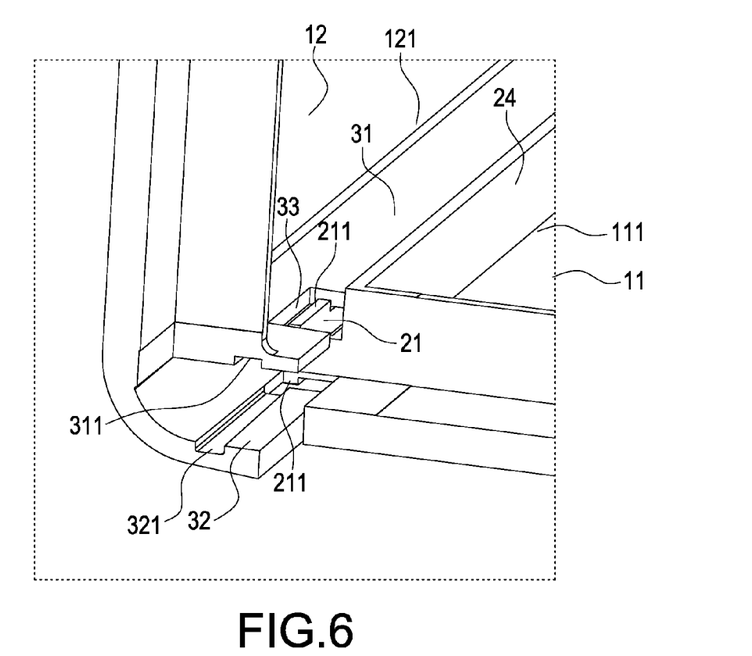
FIG. 6 is a partial perspective view of a chassis assembly structure of this disclosure.
Figure 7:
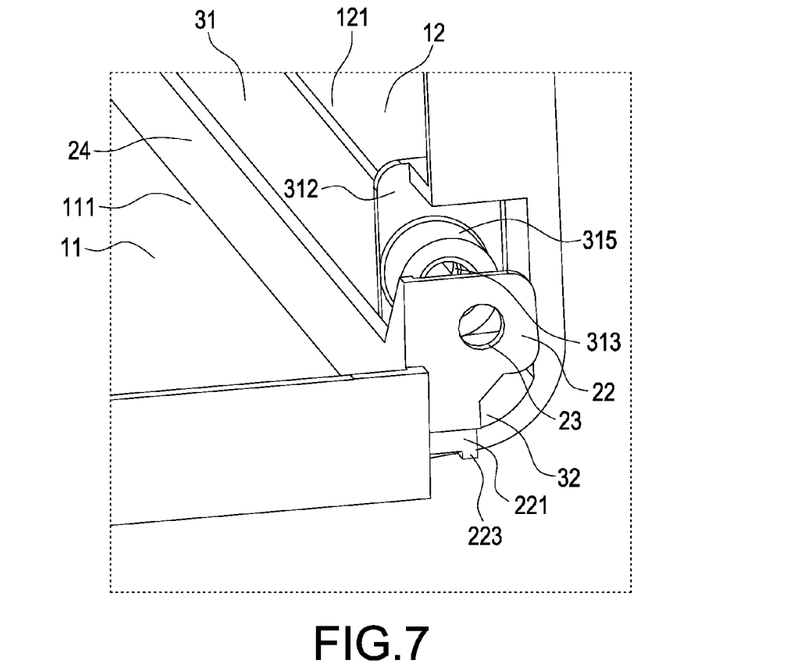
FIG. 7 is another partial perspective view of a chassis assembly structure of this disclosure.
Figure 8:
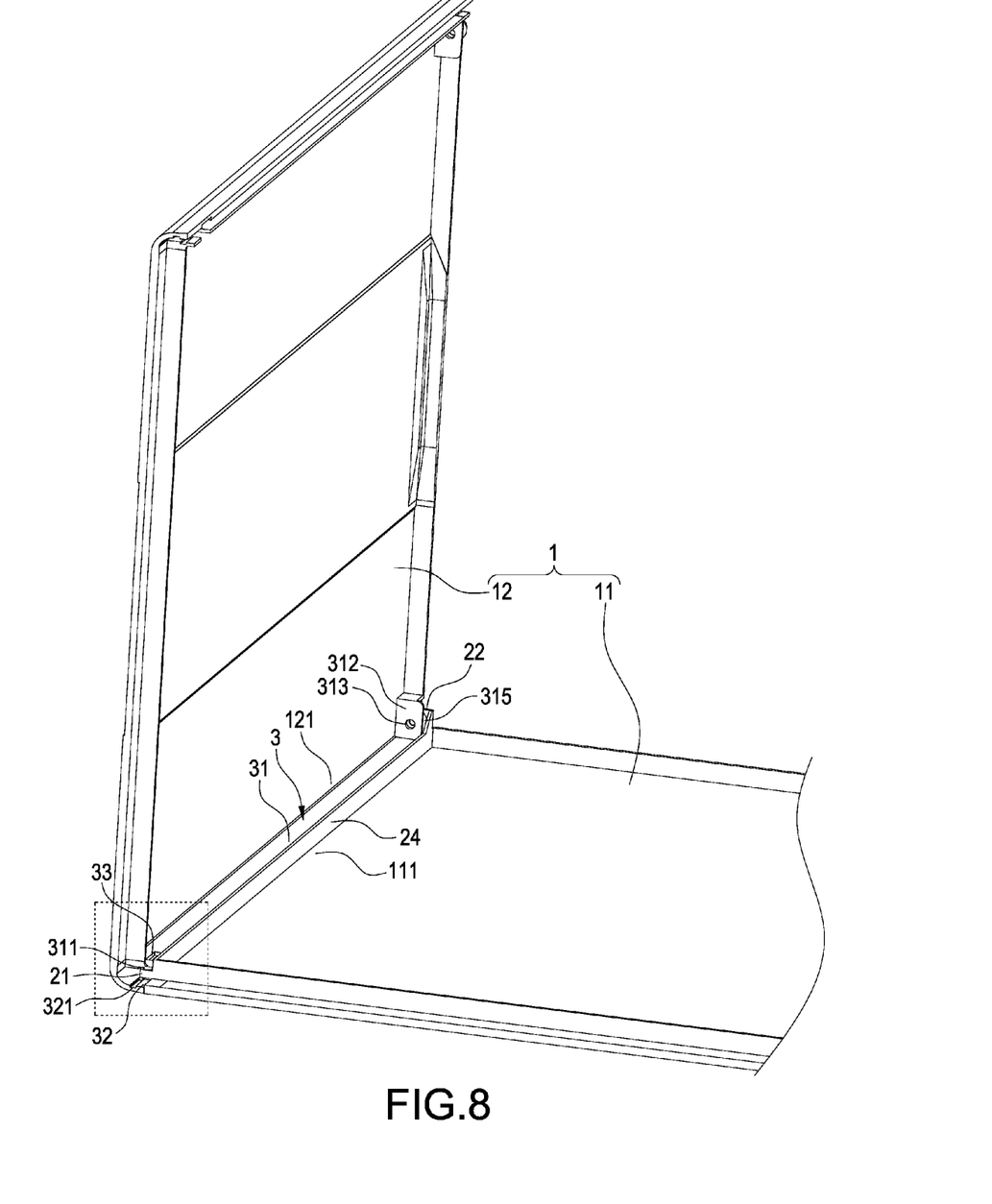
FIG. 8 is another perspective view of a chassis assembly structure of this disclosure.
Figure 9:
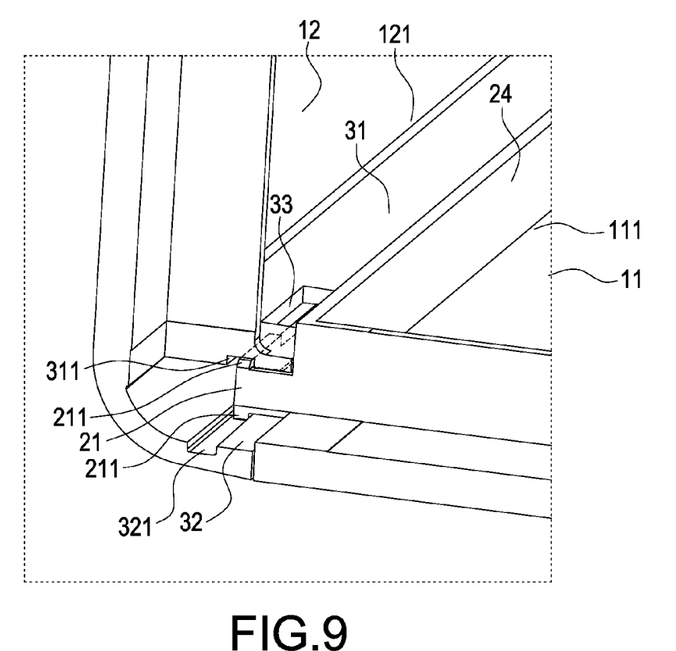
FIG. 9 is a further partial perspective view of a chassis assembly structure of this disclosure.
Figure 10:
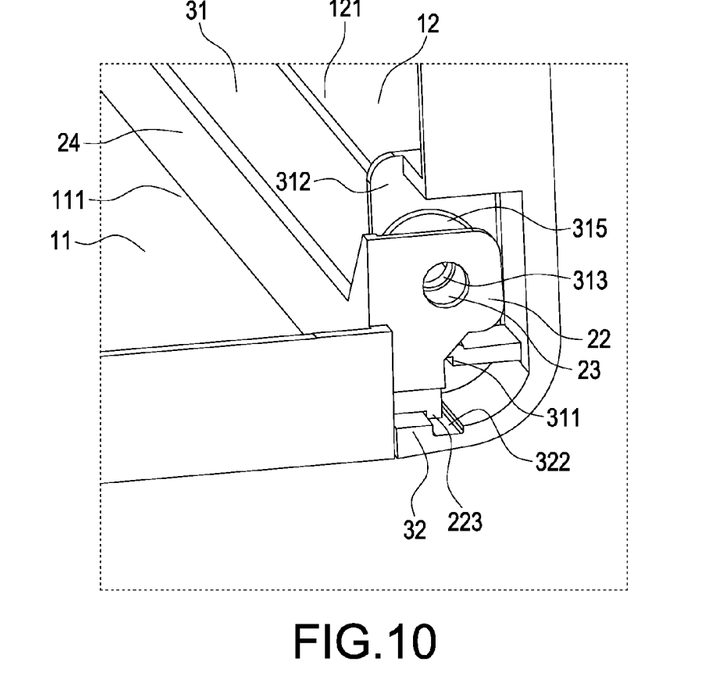
FIG. 10 is another further partial perspective view of a chassis assembly structure of this disclosure.
Figure 11:
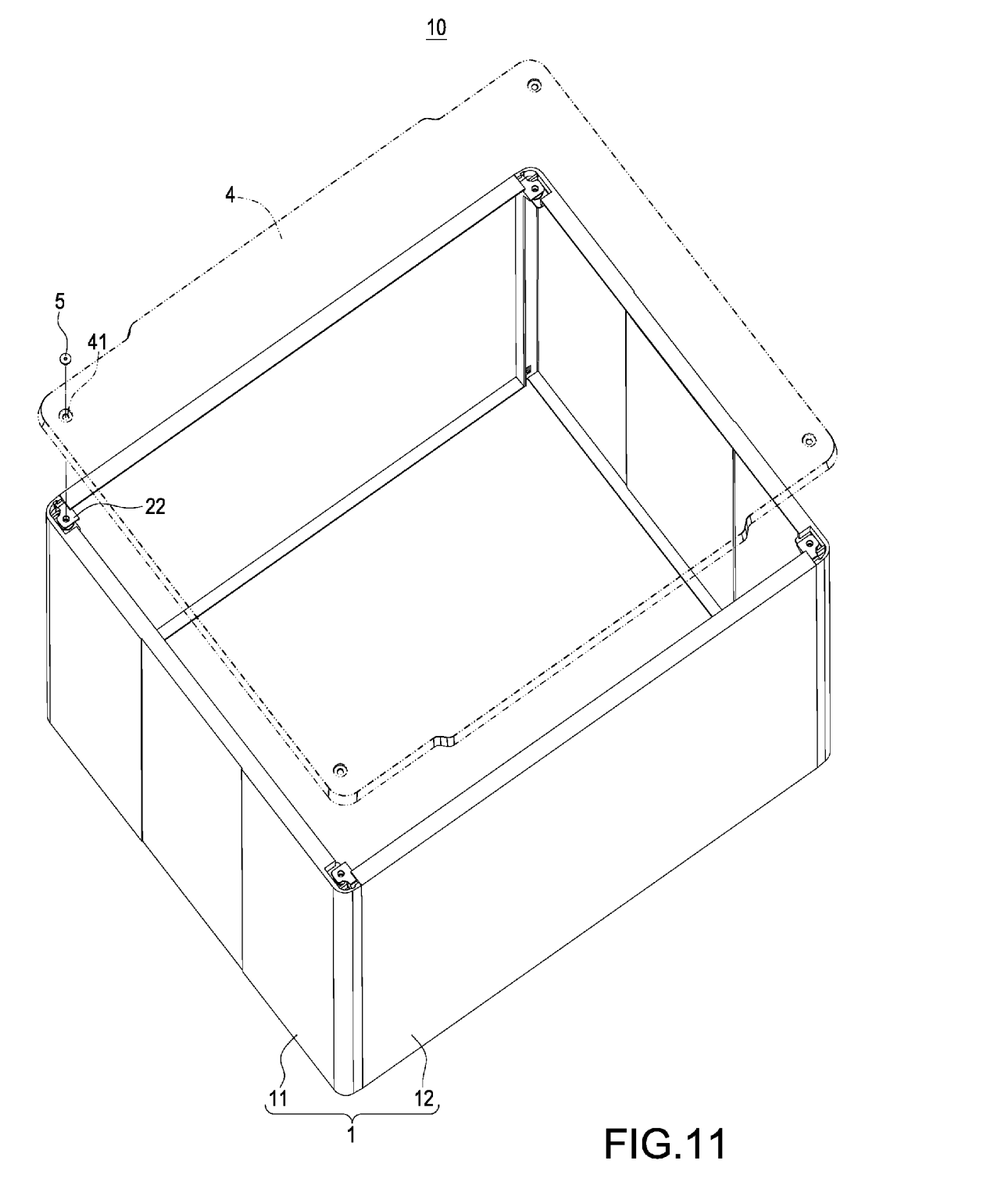
FIG. 11 is a further perspective view of a chassis assembly structure of this disclosure.
Figure 12:
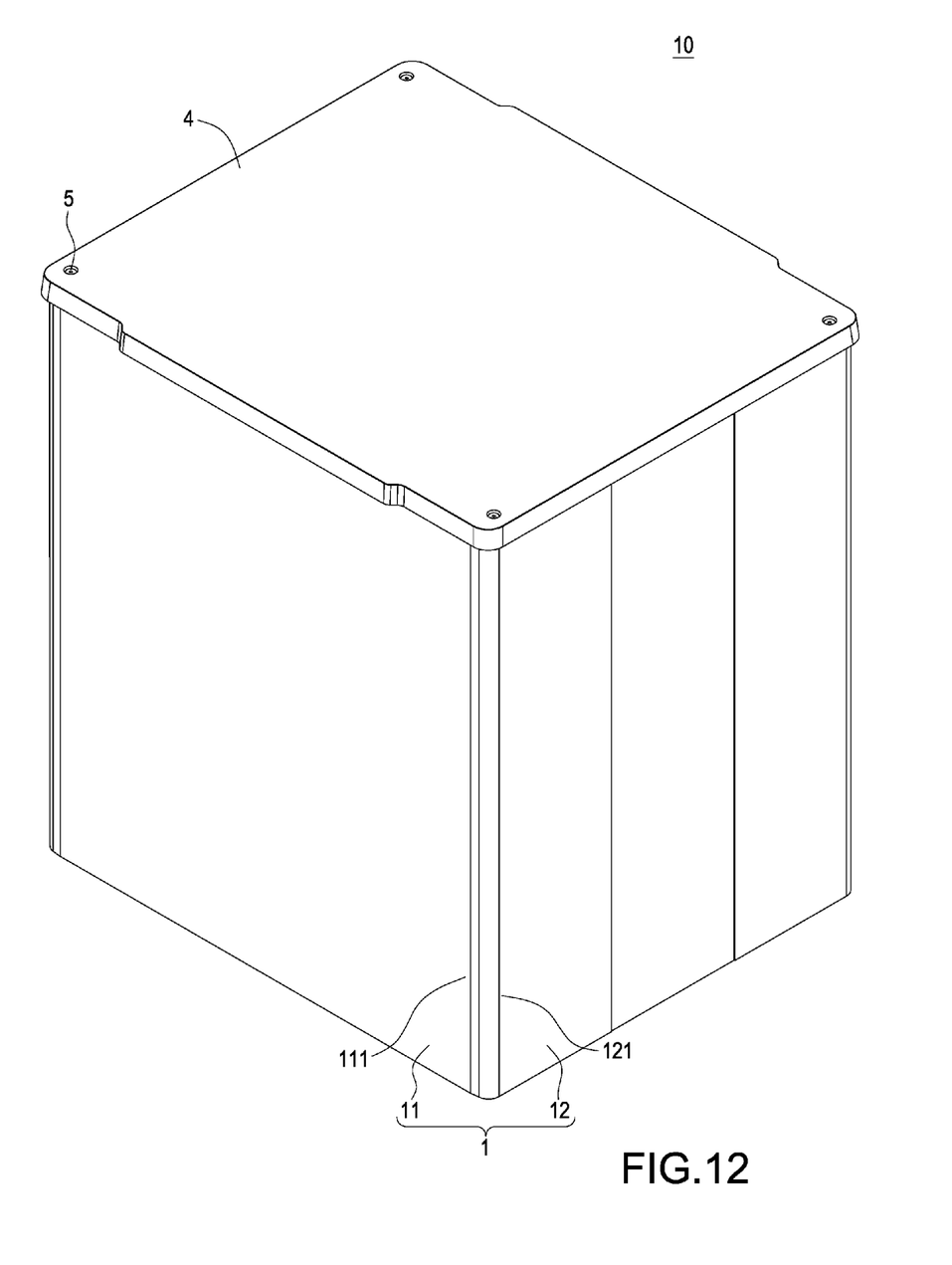
FIG. 12 is another further perspective view of a chassis assembly structure of this disclosure.

In FIGS. 1, 11 and 12, the third board 4 covers a side of the surrounding plate assembly 1, and the third board 4 has a plurality of third locking holes 41 respectively.

In FIGS. 1, 11 and 12, each locking element 5 is passed, locked, and positioned in each first locking hole 23, each second locking hole 313, each hollow column 315 and each third locking hole 41, so that the third board 4 is locked and cover a side of the surrounding plate assembly 1.

In FIGS. 1 to 12, the chassis assembly structure 10 of this disclosure comprises a surrounding plate assembly 1 formed by assembling and coupling a plurality of first boards 11 and a plurality of second boards 12 with an interval apart from one another. Each first abutting element 2 includes a slider 21 and a first stop plate 22 extended from one of the first board 11 and the second board 12, and each first stop plate 22 has a first locking hole 23. Each second abutting element 3 includes a first convex plate 31 and a second convex plate 32 extended from the other one of the first board 11 and the second board, and each first convex plate 31 has a first positioning groove 311 at an end and a second stop plate 312 at the other end, and each second stop plate 312 has a second locking hole 313, and each second convex plate 32 has a second positioning groove 321, and both ends of each slider 21 are slidably coupled and limited in each first positioning groove 311 and each second positioning groove 321. Each first stop plate 22 is stopped and limited by each second stop plate 312. The third board 4 covers a side of the surrounding plate assembly 1, and the third board 4 has a plurality of third locking holes 41 respectively. Each locking element 5 is passed and locked to each first locking hole 23, each second locking hole 313 and each third locking hole 41.

With reference to FIGS. 1 to 12 for the using status of a chassis assembly structure 10 of this disclosure, the chassis assembly structure 10 is formed by coupling a plurality of first boards 11, a plurality of second boards 12 and a third board 4, so that the chassis assembly structure 10 can be transported without assembling the first board 11, the second board 12 and the third board 4, and the chassis assembly structure 10 of this disclosure has the advantage of saving the shipping space and shipping cost.

In addition, both ends of each slider 21 are slidably coupled and limited in each first positioning groove 311 and each second positioning groove 321, and each first stop plate 22 is stopped and limited by each second stop plate 312, so that the chassis assembly structure 10 has a three-direction position limiting function to improve the stability of assembling the chassis assembly structure 10.

In addition, each first positioning groove 311 are each second positioning groove 321 are dovetail grooves, and two trapezoidal latches 211 at both ends of each slider 21 are slidably coupled and limited in the first positioning groove 311 and the second positioning groove 321. Since the first positioning groove 311 and the second positioning groove 321 have the upper and lower dovetail design, therefore a primary limiting function is achieved to enhance the stability of assembling the chassis assembly structure 10.

In addition, the second convex plate 32 has a partitioning block 323 formed among the third positioning groove 322, the second positioning groove 321 and the third positioning groove 322, and a protruding block 221 is extended from the first stop plate 22, and both ends of the protruding block 221 are slidably coupled and limited in each first positioning groove 311 and each third positioning groove 322, and the protruding block 221 is stopped and limited by each partitioning block 323 to achieve a secondary limiting function and also let a user know whether or not the structure is assembled correctly, so as to further improve the stability of assembling the chassis assembly structure 10.

While this disclosure has been described by means of specific embodiments, numerous modifications and variations could be made thereto by those skilled in the art without departing from the scope and spirit of this disclosure set forth in the claims.

What is claimed is:

1. A chassis assembly structure, comprising:
   a surrounding plate assembly, formed by assembling and coupling a plurality of first boards and a plurality of second boards with an interval apart from one another;
   a plurality of first abutting elements, each including a slider and a first stop plate extended from one of the first board and the second board, and each first stop plate having a first locking hole formed thereon;
   a plurality of second abutting elements, each including a first convex plate and a second convex plate extended from the other one of the first board and the second board, and each first convex plate having a first positioning groove formed at an end and a second stop plate extended from the other end, and each second stop plate having a second locking hole formed thereon, and each second convex plate having a second positioning groove, and both ends of each slider being slidably coupled and limited in each first positioning groove and each second positioning groove, and each first stop plate being stopped and limited by each second stop plate;

a third board, covering a side of the surrounding plate assembly, and having a plurality of third locking holes formed on the third board; and a plurality of locking elements, each passing through and being locked to each first locking hole, each second locking hole, and each third locking hole.

2. The chassis assembly structure of claim 1, wherein each first board has two opposite first edge sections, and each first abutting element is formed on each first edge section, and each second board has two opposite second edge sections, and each second abutting element is formed on each second edge section.

3. The chassis assembly structure of claim 1, wherein each first board has two opposite first edge sections, and one of the two first edge sections of each first board has the first abutting element and the other one of the two first edge sections has the second abutting element, and each second board has two opposite second edge sections, and one of the two second edge sections of each second board has the first abutting element and the other one of the second edges section of each second board has the second abutting element.

4. The chassis assembly structure of claim 1, wherein each first positioning groove and each second positioning groove are dovetail grooves respectively, and two trapezoidal latches are extended from both ends of each slider respectively, and each of the two trapezoidal latches is slidably coupled and limited in each first positioning groove and each second positioning groove.

5. The chassis assembly structure of claim 1, wherein each first convex plate and the second convex plate jointly have an installing notch, and the installing notch, the first positioning groove and the second positioning groove are communicated with one another, and each slider is embedded into the first positioning groove and the second positioning groove through the installing notch.

6. The chassis assembly structure of claim 1, wherein each first positioning groove is formed from an end of the first convex plate to the other end of the first convex plate, and each second convex plate has a third positioning groove, and each second positioning groove is formed inwardly from an end of the second convex plate, and each third positioning groove is formed inwardly from the other end of the second convex plate, and each second convex plate has a partitioning block formed between the second positioning groove and the third positioning groove, and a protruding block is extended from each first stop plate, and a trapezoidal bump and a protruding latch are extended from both ends of each protruding block respectively, and each trapezoidal latch is slidably coupled to and limited in each third positioning groove, and each protruding latch is stopped and limited by each partitioning block.

7. The chassis assembly structure of claim 1, wherein each second stop plate has a hollow column extended from the second stop plate and configured to be corresponsive to the second locking hole, and each hollow column being sandwiched between each first stop plate and each second stop plate, and each locking element being passed and positioned at each hollow column.

8. The chassis assembly structure of claim 1, wherein each first abutting element further includes an abutting plate extended from one of the first board and the second board, and each first convex plate and each second convex plate are stopped and limited by each abutting plate.

\* \* \* \* \*